US012775810B2

(12) United States Patent
Butvinik

(10) Patent No.: US 12,775,810 B2
(45) Date of Patent: Oct. 27, 2026

(54) PRECISION EVALUATION SYSTEM FOR ARTIFICIAL INTELLIGENCE GENERATED TEXT SUMMARIES

(71) Applicant: ACTIMIZE LTD, Ra'anana (IL)

(72) Inventor: Danny Butvinik, Haifa (IL)

(73) Assignee: ACTIMIZE LTD, Ra'anana (IL)

( * ) Notice: Subject to any disclaimer, the term of this patent is extended or adjusted under 35 U.S.C. 154(b) by 161 days.

(21) Appl. No.: 18/584,720

(22) Filed: Feb. 22, 2024

(65) Prior Publication Data

US 2025/0272514 A1 Aug. 28, 2025

(51) Int. Cl.
*G06F 40/51* (2020.01)
*G06F 40/30* (2020.01)

(52) U.S. Cl.
CPC .............. *G06F 40/51* (2020.01); *G06F 40/30* (2020.01)

(58) Field of Classification Search
CPC ................................ G06F 40/51; G06F 40/30
See application file for complete search history.

(56) References Cited

U.S. PATENT DOCUMENTS

2020/0143301 A1* 5/2020 Bowers ............... G06F 3/04847
2021/0124876 A1* 4/2021 Kryscinski ............ G06F 16/345
2023/0096118 A1* 3/2023 Ramsl ..................... G06F 40/30 707/736
2023/0122609 A1* 4/2023 Mukherjee .............. G06F 40/58 715/254
2024/0078380 A1* 3/2024 Madhusudhan ........ G06F 40/56
2024/0274251 A1* 8/2024 Malon ...................... G06F 40/40
2025/0200096 A1* 6/2025 Zou ......................... G06F 40/56

OTHER PUBLICATIONS

Fabbri, A. R., Kryściński, W., McCann, B., Xiong, C., Socher, R., & Radev, D. (2021). Summeval: Re-evaluating summarization evaluation. Transactions of the Association for Computational Linguistics, 9, 391-409, (Year: 2021).*

(Continued)

*Primary Examiner* — Philip H Lam
(74) *Attorney, Agent, or Firm* — Trupti P. Joshi

(57) ABSTRACT

A machine learning (ML) system and methods are provided that are configured to evaluate artificial intelligence (AI) generated text summaries using an evaluation framework for a weighting strategy of a plurality of metrics. The ML system includes a processor and a computer readable medium operably coupled thereto, the computer readable medium comprising a plurality of instructions stored in association therewith that are accessible to, and executable by, the processor, to perform summary evaluation operations which include accessing a AI generated text summary and an original text, calculating a plurality of summarization evaluation metrics, weighting the plurality of summarization evaluation metrics, computing a final evaluation score based on an aggregation of the weighted plurality of summarization evaluation metrics, outputting the precision evaluation based on the computed final evaluation score, and updating a data structure for the texts with the computed final evaluation score.

20 Claims, 6 Drawing Sheets

(56) References Cited

OTHER PUBLICATIONS

Krishna, K., Bransom, E., Kuehl, B., Iyyer, M., Dasigi, P., Cohan, A., & Lo, K. (2023). LongEval: Guidelines for human evaluation of faithfulness in long-form summarization. arXiv preprint arXiv:2301.13298 (Year: 2023).*

Kumar, J., & Vashistha, R. (Jul. 2023). Automatic Assessment System Using Topic Modelling and TF-IDF Approach. In 2023 IEEE World Conference on Applied Intelligence and Computing (AIC) (pp. 81-85). IEEE. (Year: 2023).*

Rosamma, K. S., & Patil, N. (Dec. 2023). Measuring the Quality of Text Summarization: A Survey of Evaluation Approaches. In 2023 OITS International Conference on Information Technology (OCIT) (pp. 290-296). IEEE. (Year: 2023).*

Zhao, W., Strube, M., & Eger, S. (May 2023). DiscoScore: Evaluating text generation with BERT and discourse coherence. In Proceedings of the 17th Conference of the European Chapter of the Association for Computational Linguistics (pp. 3865-3883). (Year: 2023).*

* cited by examiner

PRECISION EVALUATION SYSTEM FOR ARTIFICIAL INTELLIGENCE GENERATED TEXT SUMMARIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to artificial intelligence (AI) and machine learning (ML) systems and models, such as those that may be used for anti-money laundering (AML) and fraud detection with financial institutions, and more specifically to a system and method for programmatically evaluating AI generated summaries of original texts for precision of summarization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Financial crimes threaten the financial industry by undermining trust, integrity, and stability that users have in their financial institutions. Financial crimes encompass a broad range of illicit activities that can cause significant harm to businesses, consumers, and economies, including, but not limited to, fraud, money laundering, embezzlement, tax evasion, and cybercrime. To combat these activities, financial institutions have responded by implementing various risk management and investigation techniques. However, the ever-evolving landscape of financial crimes presents an ongoing and formidable challenge when identifying and investigation financial crimes. For example, traditional fraud and risk alert investigation processes and procedures rely heavily on manual processes and efforts by investigators, and therefore, struggle to keep pace with the increasingly sophisticated techniques that criminals employ. Further, investigators face overwhelming data volumes, intricate patterns, and the urgency of timely decision-making.

Thus, investigators face challenges in analyzing vast volumes of data, detecting subtle patterns, and making timely decisions. ML and other AI models and engines have shown substantial promise and effectiveness in assisting with such tasks. ML algorithms may be used to sift through vast quantities of data to identify patterns and anomalies that may indicate fraudulent activity. These algorithms may be utilized in models and systems that can flag suspicious transactions, detect patterns linked to known fraudulent behavior, and/or identify new patterns of fraud or suspicious activity as they emerge.

Text summarization, a domain within natural language processing (NLP), has garnered attention for extractive and abstractive summarization techniques that may be applied to assist with financial crime investigations. Extractive summarizations methods may create summaries by identifying and extracting portions, sections, or other content from an original source text, whereas abstractive methods may generate new sentences to encapsulate the original text's main ideas or other abstractive content. Evaluation and assessment of the precision of these summarizations may be performed using different metrics including ROUGE (Recall-Oriented Understudy for Gisting Evaluation) and BLEU (Bilingual Evaluation Understudy) as the most widely recognized. Both these metrics compare a machine-generated summary with a human-written reference summary, focusing primarily on the overlap of n-grams (e.g., a sequence of n adjacent symbols in a particular order, such as successive words, characters, groups of words or the like) between the two. While effective in many scenarios, the models that compute these metrics operate largely at the lexical level, which may miss needed nuances of meaning and coherence.

Other metrics, such as a metric for evaluation of translation with explicit ordering (METEOR), attempt to address these issues by considering synonyms, stemmed words, and paraphrases, thereby providing a more linguistically aligned evaluation. However, their increased complexity and need for additional linguistic resources limit their general applicability. Methods that may leverage contextual embeddings from transformers, such as a bidirectional encoder representations from transformers (BERT) score, may measure semantic similarity, which correlates better with human judgement, but are computationally expensive and require fine-tuning for optimal performance.

As such, the aforementioned AI techniques exhibit significant limitations, including issues with capturing the full range of linguistic phenomena that contribute to a high-quality summary of a text document or other content. The AI techniques may require high-quality reference summaries, which may not be available or fully represent the information in the source document. As such, a solution to these technical problems in summarization evaluation is required to address limitations with conventional AI automated and/or assisted text summarization. Consequently, it is desirable to provide a more holistic, efficient, and effective method of assessing the precision of text summarization, which can capture both semantic alignment with the source text and quality aspects of the summary. Therefore, there is a need for an automated, intelligent, and accurate computing system and framework that can assist in evaluating the precision of text summarizations by AI models and engines.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
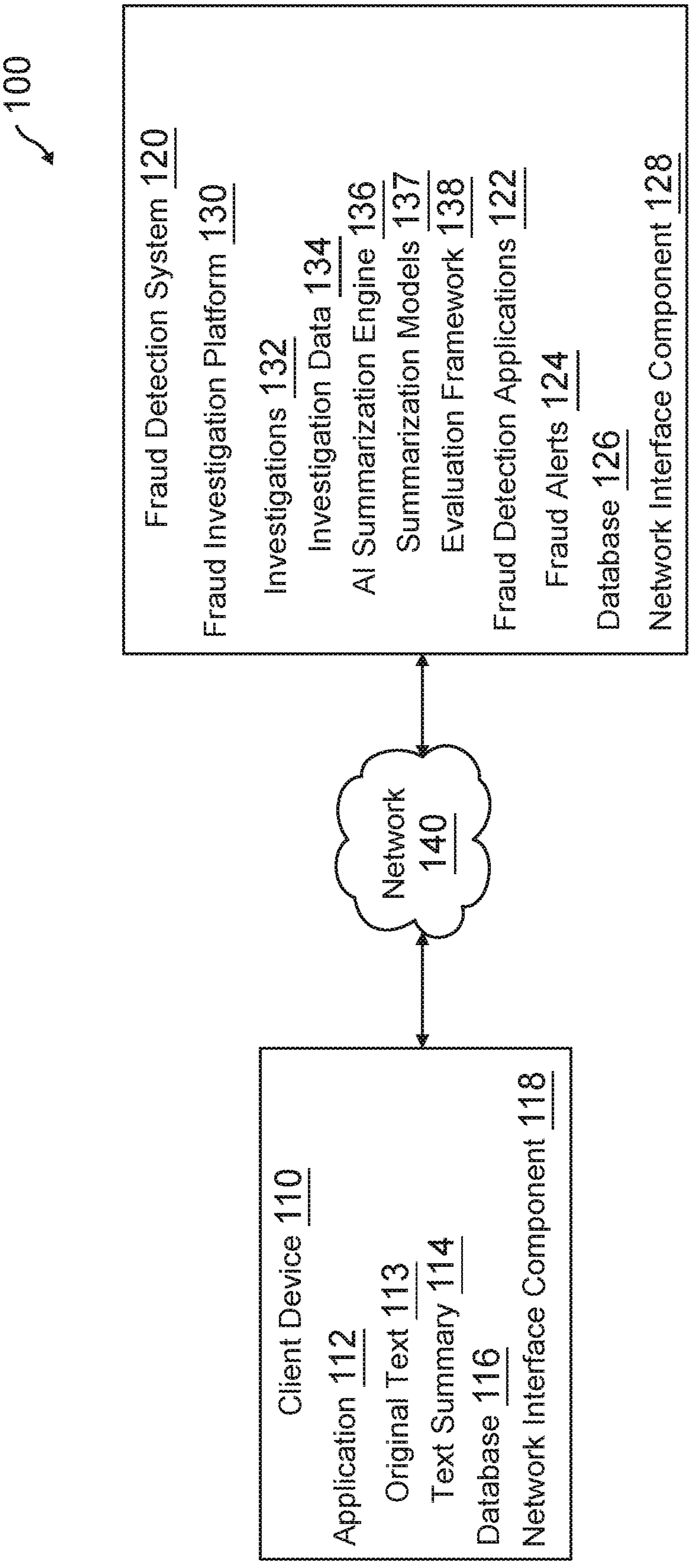
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to programmatically analyze, assess, and provide precision evaluations for AI generated text summaries, an ML system may be configured to evaluate the AI generated text summaries through an evaluation framework that applies different categories of summarization evaluation metrics for final or overall score computations. The ML system may calculate individual scores for the metrics in the categories, as well as the overall scores for those categories, weight and compute final scores of the summarizations, and output the precision evaluations for the summaries based on those scores. The evaluation framework may utilize ML models, generative and conversational AI, large language models (LLMs), and other related components to create a precision assessment scoring engine. ML algorithms may be utilized for training and implementing the evaluation system to provide improved evaluation of the precision of text-generated summaries from original texts. The algorithms may utilize multiple metrics to assess generated summaries comprehensively. To achieve a holistic, more accurate, and improved evaluation, a weighted aggregation strategy may assign an importance to different categories of evaluation metrics based on their relevance and significance in assessing precision by considering various dimensions of summary quality.

In text summarization, precision is a metric that evaluates the extent to which the information included in the summary is present in the original document or other content. Text summarization may be performed through extractive summarization and/or abstractive summarization. Extractive summarization involves directly extracting or referencing sentences or phrases from the original text when generating the summary. The structure and wording of the content in the summary are typically identical to the source text and may essentially correspond to a subset of the original text or content as a selection of the relevant or important sentences or other portions of text. Therefore, precision in extractive summarization may be measured using metrics such as ROUGE, BLEU, or other algorithm that focuses on n-gram overlap between the summary and the original text. These metrics attempt to capture how well the selected excerpts from the original text represent the overall content.

In contrast, abstractive summarization involves generating new sentences to describe the original text's content. The generated sentences may not exist in the original document but are designed to capture and convey the main ideas in a condensed form. In this case, metrics like BERTScore, METEOR, or embedding-based methods like word movers' distance (WMD) or MoverScore may capture semantic similarity and paraphrasing. In abstractive summarization, the generated summary may semantically match the reference without having exact word overlap such that metrics that evaluate semantic equivalences are more appropriate. By categorizing the types of summarizations, evaluation metric may be aligned with the properties of the type of the summarization process. This ensures that the strengths of the summarization method are appropriately evaluated and that any shortcomings are adequately identified, as well as minimizing the frequency or significant of, or avoiding, misleading evaluations.

The evaluation framework executed by the ML system may begin by categorizing the evaluation metrics into four distinct categories, although other amounts, selections, types, and/or combinations of the following categories may also be used. The first category may correspond to content quality metrics including ROUGE-1, ROUGE-2, ROUGE-L, BLEU, METEOR, and BERTScore, which assess the content overlap and accuracy of the generated summary compared to the original text. The second metric category may correspond to coherence and structure metrics including global coherence, length ratio, overlap coefficient, and normalized cross entropy, which focus on the coherence, structure, and fluency of the generated summary. The third metric category may include semantic similarity metrics including semantic similarity (e.g., a BERT-based or RoBERTa-based metric), which gauge the semantic resemblance between the generated summary and the original content. The fourth metric category may include entity preservation metrics, which evaluate how well important entities are retained in the generated summary.

Thereafter, the evaluation framework may apply weights to scores calculated from the individual metric category scores (e.g., a weighted aggregate score of the individual metric scores in the category). The framework may use weight assignment based on domain understanding, where weights are introduced for each category based on an understanding of the importance of specific aspects for a summary precision assessment. As such, categories may be weighted the same or on a separate individual basis based on domain importance and understanding, which may be specifically configured for the text domain and/or summarization process/AI model.

Weights may be assigned to categories based on different justifications and/or based on administrator or data scientist settings. For example, with content quality metrics, content quality may be identified as fundamental to the precision of generated summaries and therefore be weighted to emphasize the importance of accurate content representation. Coherence and structure may significantly impact a summary's readability and overall impression, thereby justifying a corresponding weight depending on the importance of such factors. With semantic similarity metrics, two or more representative metrics may be used, and the category's weight may be set to provide a substantial assessment of semantic alignment. Entity preservation may be vital in maintaining the context and important information in the summary with a weight assigned to highlight its significance. A weighted aggregation may therefore allow for a more nuanced evaluation of summary precision, considering various dimensions of summary quality. This provides a comprehensive assessment that reflects a well-formed summary of domain-specific requirements and expectations As such, the evaluation framework and ML models and techniques differ from conventional precision evaluation systems. For example, by effectively handling different evaluation metrics for different summarization techniques according to the present disclosure, more accurate and comprehensive evaluations of text summarizations may be generated. By incorporating weighted categories of metrics, the evaluation framework may address the limitations of traditional evaluation approaches and ensure a more accurate and informative evaluation of text summaries and text summarization AI systems and models. The weighted aggregation strategy offers a practical and adaptable solution for evaluating precision, thereby providing benefits in diverse domains, such as NLP, ML, and information retrieval.

As such, the embodiments described herein provide methods, non-transitory computer program products, and computer database systems for an ML system that programmatically processes, evaluates, and provides evaluation of AI-based summarizations of text documents and other content through the use of an evaluation framework implementing a weighted scoring technique to evaluation metrics. The evaluation framework significantly advances financial crime detection by delivering (e.g., using AI, online machine learning, and decision theory) a highly efficient and real-time automated solution for investigating financial crime through faster, more efficient, and more accurate evaluations of summarizations used when reviewing and processing investigation data of such financial crimes.

According to some embodiments, in an ML system accessible by a plurality of separate and distinct organizations, ML algorithms, features, and models are provided for an evaluation framework that performs intelligent precision evaluations through metric categorization and weighting, thereby providing faster, more efficient, and more precise ML model evaluation and processing of AI text summaries created during fraud investigations.

Example System and Computing Environment

The system and methods of the present disclosure can include, incorporate, or operate in conjunction with, or in the environment of, an ML engine, model, and intelligent system, which may include an ML or other AI computing architecture that provides automated and programmatic precision evaluations of AI text summarizations from text content generated during fraud investigations or other processes. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, ML models, NNs, and other AI architectures have been developed to improve predictive analysis and classifications by systems in a manner similar to human decision-making, which increases efficiency and speed in performing predictive analysis on datasets requiring machine predictions, classifications, and/or analysis. One or more devices and/or servers may be operated and/or maintained by the same or different entities.

FIG. 1 illustrates a block diagram of an example environment 100 according to some embodiments. Environment 100 may include a client device 110 and a fraud detection system 120 that interact over a network 140 to provide intelligent fraud detection, prevention, and investigation with AI generated text summaries and summarization precision evaluations to streamline and optimize fraud and other risk alert investigation processes, as discussed herein. In other embodiments, environment 100 may not have all of the components listed and/or may have other elements instead of, or in addition to, those listed above. In some embodiments, environment 100 is an environment in which ML models may be executed to perform summarization precision evaluation operations, such as for fraud investigation or other domains, tasks, and fields, and therefore may not be limited to fraud investigations but applicable to other AI summarization models, engines, and domains. As illustrated in FIG. 1, fraud detection system 120 might interact via a network 140 with client device 110 to generate, provide, and output precision evaluations of summarizations of text and other content from client device 110 or other devices, servers, databases, and/or data sources.

For example, in fraud detection system 120, fraud detection applications 122 may process data and return fraud alerts 124 from fraud detection and risk analysis using one or more ML models, such as ML models of ML fraud detection engines that intelligently detect fraud. ML fraud detection engines may use ML models that are trained for fraud detection generally, on a per-tenant basis, and/or based on other training data. The ML models for detecting fraud alerts 124 by fraud detection applications 122 may include offline and/or online ML models, where offline ML models may each be trained and deployed based on a training data set and online ML models may provide continuous learning and adaptation to new and changing datasets, such as emerging trends using live or streaming data. As such, fraud detection system 120 may be utilized to provide fraud detection or other ML operations to tenants, customers, and other users or entities via fraud detection applications 122, which may result in fraud alerts 124. Fraud alerts 124 may include text data and other content, which may be summarized in text summaries.

To investigate real or potential fraud being flagged by fraud alerts 124, a fraud investigation platform 130 may be invoked and utilized to intelligently manage and assist with evaluating fraud and other investigations, as discussed herein. Fraud detection applications 122 may therefore provide fraud detection services, which may include and/or be utilized in conjunction with computing services provided to customers, tenants, and other users or entities accessing and utilizing fraud detection system 120. ML fraud detection engines of fraud detection applications 122 may be executed by fraud detection system 120 and/or provided to be utilized with other ML systems and models, such as those managed by separate computing systems, servers, and/or devices (e.g., tenant-specific, or controlled servers and/or server systems that may be separate from fraud investigation platform 130 discussed herein). In this regard, fraud investigation platform 130 may assist with processing fraud alerts 124, such as by summarizing text data from one or more of fraud alerts 124, as well as checking and evaluating summarizations of text data and other content. Client device 110 may include an application 112 that provides an original text 113 for summarization (e.g., text data from one or more of fraud alerts 124 for a fraud investigation) and receives a text summary 114 including an AI generated text summary, text precision analysis or evaluation, score for text precision overall or on a per-metric or per-category-of-metrics bases, and the like.

Fraud investigation platform 130 of fraud detection system 120 may therefore manage investigations 132 for different investigations, where investigations 132 have corresponding investigation data 134 including evidence, reports, disputes, responses, and other content from and/or generated during investigation of fraud alerts 124. For example, investigations 132 may include a series of steps, operations, and procedures processed, adjudicated on, and/or evaluated based on investigation data 134, where investigation data 134 may include different text, image, video, graphical, or other content used during investigation adjudication. To provide intelligent and efficient investigation processing and evaluation, text summarization by an AI summarization engine 136 is further provided, which may utilize summarization models 137 to provide different summarizations including extractive and/or abstractive summarization. As such, to evaluate the accuracy, precision, and quality of the summarizations provided by summarization models 137, an evaluation framework 138 may be provided to assess precision and other analytics by scoring summarizations using metrics and weighted scores of categories of metrics.

In this regard, original text 113 may be received by AI summarization engine 136 from application 112 for generation of text summary 114. In other embodiments, original texts may be received from other sources, such as fraud alerts 124 directly, data stored by a database 126 of fraud detection system 120 or other data storage component, online data streams, available data sources, or data repositories that may provide content for summarization. AI summarization engine 136 may utilize one or more of summarization models 137 to provide extractive and/or abstractive AI summarization of original text 113, such as by generating text summary 114 that includes AI generated text summarizing original text 113 in a more condensed version. AI summarization engine 136 may then utilize evaluation framework 138 to determine a precision evaluation of text summary 114 as summarizing original text 113. To do so, a text processing module may provide data preprocessing for ML model processing and/or metric scoring, including word or character tokenization, lemmatization, and/or entity extraction, where the processed data may then be scored and calculated using one or more metric scoring models for one or more text summarization precision metrics, such as ROUGE-1, 2, or L, BLEU, METEOR, BERTScore, robustly optimized BERT pretraining approach (RoBERTa), global coherence, length ration, overlap coefficient, normalized cross entropy, entity preservation, semantic similarity (BERT or RoBERTa-based scores), a precision-at-K score, a word error rate, or any combination thereof.

To compute global coherence, a preprocessing string function, a topic modeling library for a Latent Dirichlet Allocation (LDA) model, a Hellinger distance for a similarity measurement corresponding to the similarity score, a similarity score calculation with the similarity measure for the similarity score, or any combination thereof may be used, as discussed herein. Global coherence may also be calculated as a similarity score between sentence pairs, which may use cosine similarity and efficient pair-wise calculations. Scores may be aggregated on a per-category of metrics basis, where one or more metrics may be grouped in categories including content quality metrics, coherence and structure metrics, semantic similarity metrics, entity preservation metrics, or any combination thereof. Thereafter, a weighting strategy and weights may be applied on a per-metric (e.g., each metric within a category) or a per-category basis, and a score for each category may be computed.

Using the weighted scores for the categories, a final evaluation score may be determined, which may be used to assess the precision evaluation of text summary 114 as summarizing original text 113. This score may be output within a system and/or to a user, such as in a dashboard provided by fraud detection system 120 (e.g., for investigations 132, such as with investigation data 134, in a dashboard, portal, or interface of fraud investigation platform), as well as output and displayed by client device 110, such as in an interface of application 112. Further, a data container including original text 113 and/or text summary 114, such as a data structure, file or the like initially holding and storing original text 113 and text summary 114, may be updated to store the final score and/or precision evaluation. As such, a data container, file, or other data structure may be configured to store original text 113 and text summary 114 with the precision evaluation and score for later use and assessment. The operations, components, and models of evaluation framework 138 are discussed in further detail below with regard to FIGS. 2-5 below.

For ML models (e.g., decision trees and corresponding branches, NNs, clustering operations, etc.) including those of summarization models 137 and/or evaluation framework 138, the models may be trained using training data, which may correspond to stored, preprocessed, and/or feature transformed data associated with fraud investigations and investigations 132 including investigation data 134 and other original text, AI generated text summaries, and/or summarization scoring or precision evaluations. With continuous and/or reinforcement training, live streaming data from one or more production, live, and/or real-time computing environments and/or feedback from different entities may be used. Model training and configuring may include performing feature engineering and/or selection of features or variables used by ML models. Features or variables may correspond to discreet, measurable, and/or identifiable properties or characteristics, such as those for the data corresponding to original text 113, text summary 114, and/or other text summarization data and evaluations.

ML models of fraud detection system 120 may be trained using one or more ML algorithms, operations, or the like for modeling (e.g., including configuring decision trees or neural networks, weights, activation functions, input/hidden/output layers, and the like). Thus, one or more ML models, NNs, or other AI-based models and/or engines may be trained for fraud detection or another ML task. The training data may be labeled or unlabeled for different supervised or unsupervised ML and NN training algorithms, techniques, and/or systems. Fraud detection system 120 may further use features from such data for training, where the system may perform feature engineering and/or selection of features used for training and decision-making by one or more ML, NN, or other AI algorithms, operations, or the like (e.g., including configuring decision trees, weights, activation functions, input/hidden/output layers, and the like).

An ML model may then be trained using a function and/or algorithm for the model trainer, as well as other ML systems, trainers, and operations for model and/or engine training and development. The training may include adjustment of weights, activation functions, node values, and the like. After initial training of ML models using supervised or unsupervised ML algorithms (or combinations thereof), ML models may be evaluated and/or released in a production computing environment. ML models may be deployed to take and process input data for model features and predict labels or other classifiers from the input data. Offline ML models may be released and implemented in a static manner, such as without updating and/or updating through release of new versions that may be deployed at specific times and by bringing one or more ML models offline for updating, versioning, patching, and the like. In contrast, deployed online ML models may be initially trained and/or configured for training, and may continuously learn as data is streamed and/or provided during decision-making.

One or more client devices and/or servers (e.g., client device 110 using application 112) may execute a web-based client that accesses a web-based application for fraud detection system 120, or may utilize a rich client, such as a dedicated resident application, to access fraud detection system 120, which may be provided by fraud detection applications 122 to such client devices and/or servers. Client device 110 and/or other devices or servers may utilize one or more application programming interfaces (APIs) to access and interface with fraud detection applications 122 and/or ML fraud detection engines of fraud detection system 120 in order to access, review, and evaluate fraud investigations and summary evaluations using the operations discussed herein. Interfacing with fraud detection system 120 may be provided through fraud detection applications 122 and/or fraud investigation platform 130, and may be based on data stored by database 126 of fraud detection system 120 and/or database 116 of client device 110.

Client device 110 and/or other devices and servers on network 140 might communicate with fraud detection system 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and fraud detection system 120 may occur over network 140 using a network interface component 118 of client device 110 and a network interface component 128 of fraud detection system 120. In an example where HTTP/HTTPS is used, client device 110 might include an HTTP/HTTPS client for application 112, commonly referred to as a "browser," for sending and receiving HTTP/HTTPS messages to and from an HTTP/HTTPS server, such as fraud detection system 120 via the network interface component.

Similarly, fraud detection system 120 may host an online platform accessible over network 140 that communicates information to and receives information from client device 110. Such an HTTP/HTTPS server might be implemented as the sole network interface between client device 110 and fraud detection system 120, but other techniques might be used as well or instead. In some implementations, the interface between client device 110 and fraud detection system 120 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

Client device 110 and other components in environment 100 may utilize network 140 to communicate with fraud detection system 120 and/or other devices and servers, and vice versa, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol. Further, one or more of client device 110 and/or fraud detection system 120 may be included by the same system, server, and/or device and therefore communicate directly or over an internal network.

According to one embodiment, fraud detection system 120 is configured to provide webpages, forms, applications, data, and media content to one or more client devices and/or to receive data from client device 110 and/or other devices, servers, and online resources. In some embodiments, fraud detection system 120 may be provided or implemented in a cloud environment, which may be accessible through one or more APIs with or without a corresponding graphical user interface (GUI) output. Fraud detection system 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, client device 110, shown in FIG. 1, executes processing logic with processing components to provide data used for fraud detection applications 122 and/or fraud investigation platform 130 of fraud detection system 120. In some embodiments, this may include processing original text 113 and providing text summary 114, as well as a precision evaluation of text summary 114. In one embodiment, client device 110 includes application servers configured to implement and execute software applications as well as provide related data, code, forms, webpages, platform components or restrictions, and other information, and to store to, and retrieve from, a database system related data, objects, and web page content. For example, fraud detection system 120 may implement various functions of processing logic and processing components, and the processing space for executing system processes, such as running applications for fraud investigations and/or other risk analysis and fraud detection capabilities. Client device 110 and fraud detection system 120 may be accessible over network 140. Thus, fraud detection system 120 may send and receive data to client device 110 via network interface component 128. Client device 110 may be provided by or through one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients. Client device 110 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to fraud detection system 120 that provides one or more APIs for interaction with client device 110.

Thus, client device 110 and/or fraud detection system 120 and all of their components might be operator configurable using application(s) including computer code to run using a central processing unit, which may include an Intel Pentium® processor or the like, and/or multiple processor units. A server for client device 110 and/or fraud detection system 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and fraud detection system 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Evaluation Framework for Precision Evaluations of AI Generated Text Summaries

Figure 2:
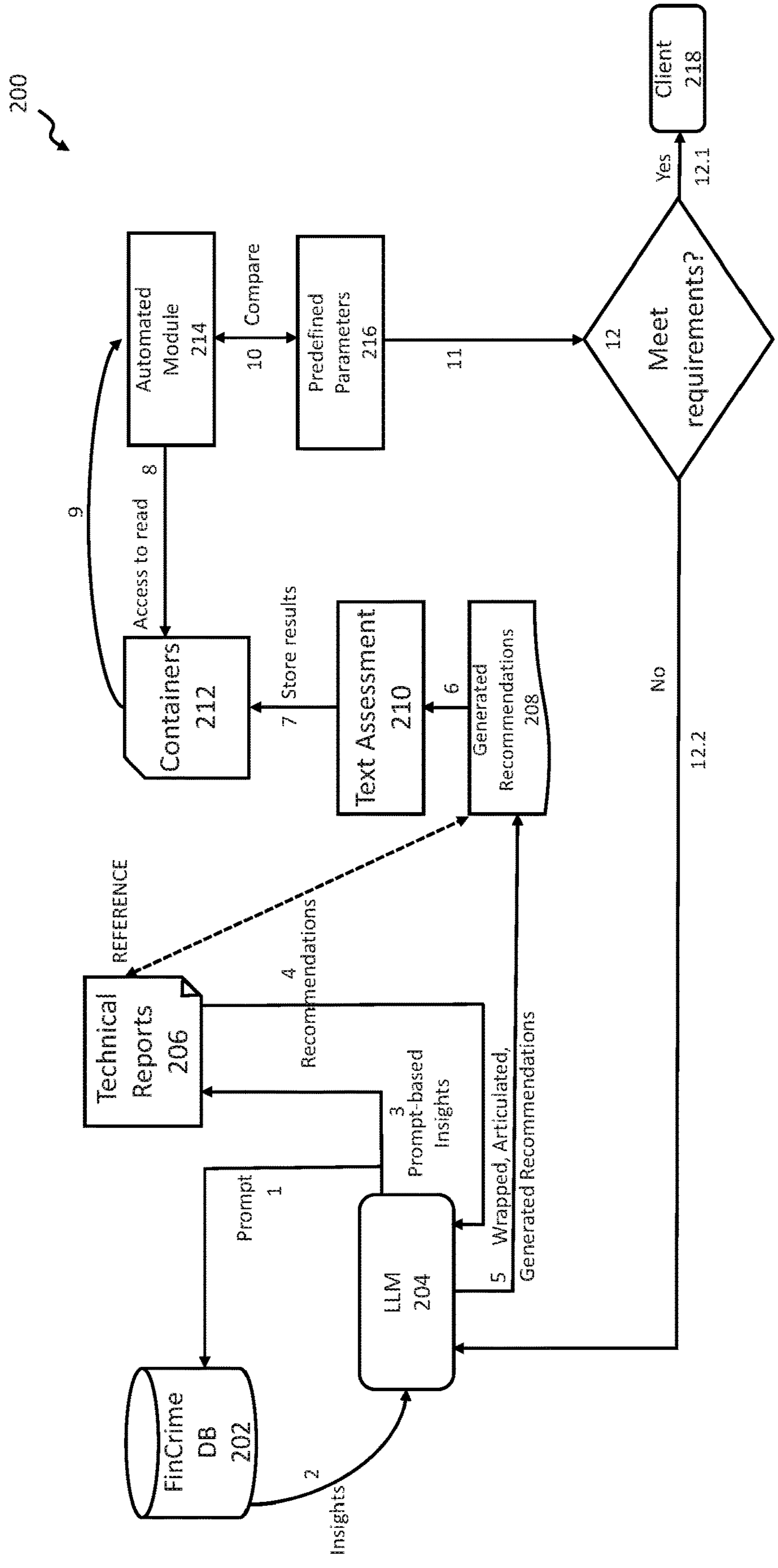
FIG. 2 is a simplified computing architecture where AI generated text summaries may be evaluated for precision of summarization by an AI summarization engine according to some embodiments.

FIG. 2 is a simplified computing architecture 200 where AI generated text summaries may be evaluated for precision of summarization by an AI summarization engine according to some embodiments. Computing architecture 200 of FIG. 2 includes steps 1-12 performed by a service provider during AI summarization of text documents and other content and precision evaluation of such summarizations, such as steps and operations performed by fraud detection system 120 from environment 100 of FIG. 1. In this regard, AI summarization engine 136 may be executed by fraud detection system 120 to perform steps 1-12 using the components of computing architecture 200.

In this regard, a financial crime database 202 may include data structures storing various documents, content, and other data associated with financial crimes and investigations of such crimes. As such, financial crime database 202 may include text documents, files, and other content that may be summarized to provide a more concise, condensed, and understandable summarization of the full underlying text. Financial crime database 202 may be used by LLM 204 when prompted, at step 1, to analyze a particular original text, such as the text for a financial crime alert or the like that may be generated based on a suspected or detected financial crime, fraud, risk activity, or the like. The prompt may correspond to a query or the like, such as how many transactions above $500 or other amount have occurred with a particular account or set of accounts, using a payment mechanism, in a jurisdiction, having a set of parameters (e.g., sender/received location, items, etc.), or the like.

The logic and/or models of LLM 204 may provide intelligent outputs, such as classifications, decision-making, predictions and the like, in an automated manner without user input or intelligence. These models attempt to mimic human thinking by learning from training data to make correlations, predictions, and interpretations based on pattern analysis and the like. ML models may correspond to different types of classifications of models, such as NNs, tree-based models, clustering models, etc. For example, with decision trees, a tree model may be used where each decision path from the "root" of the tree to a "leaf" may serve as a rule. The rule's maximum complexity may be given by the tree's maximum depth. With neural networks, layers may be trained having nodes with activation functions and weights that are interconnected between layers to resemble neurons and mimic human thinking through feed forward and/or backwards propagation networks.

For ML model training, supervised, unsupervised, and/or reinforcement learning may be used in order to learn from the past historical data, as well as positive and negative experiences and/or feedback for investigation assistance, data decisioning, and the like. This training data may be associated with text summarization including labeling of summaries for good, bad, acceptable, unacceptable, or other designation for a summary precision assessment. Reinforcement learning may also provide an explainable AI, which allows for identification and provision of the underlying rationale behind decisions and outputs. LLM 204 may also include ChatGPT models, including one or more LLMs, GPTs, or other conversational and/or generative AIs that may generate extractive and/or abstractive summaries of text input and content, as well as perform other intelligent generative tasks. For example, generative AI and LLMs may be used to process and analyze large amounts of textual data to extract and/or generate relevant insights, identify patterns, and detect potential instances of financial crime, as well as perform summarization of text content.

The prompt may therefore be used to determine insights, at step 2, provided back to LLM 204. Insights may include patterns in data from the prompts. For example, when analyzing all transactions over $500 or other amount, patterns may indicate that all transactions occurring after 12 PM (12:00) should be analyzed for fraud and/or suspected fraud indications, that is, all or a subset of transactions after 12 PM may cause a fraud alert to be generated. The insights may therefore correspond to patterns in data that may be indicative of further required analysis and/or a particular behavior or activity. As such, LLM 204 may provide, to technical reports 205, prompt-based insights for recording and analysis, at step 3. The prompt-based insights may be stored with technical reports 206 for further analysis and reporting, which may be summarized in one or more AI generated text summaries.

At step 4, recommendations are determined and generated by LLM 204 based on technical reports 206. For example, a recommendation may be generated to check all transactions after 12 PM to determine if a trend exists hourly or on another periodic basis. If so, then a fraud alert may be generated and reported for analysis by a fraud detection and/or investigation agent or specialist. LLM 204, at step 5, may provide the wrapped, articulated, and generated recommendations to a database, data storage component, or data table for generated recommendations 208. As such, generated recommendations 208 may include text content, documents, and the like for analysis, which may also be summarized by an AI summarization engine and/or model. In this regard, at step 6, text assessment 210 is performed to generate text summarizations of generated recommendations 208 or other text content using extractive or abstractive text summarization and an AI model configured and trained to perform such summarization techniques. In various embodiments, the ML models of text assessment 210 may be implemented in the same or similar manner to those described for LLM 204.

At step 7, the results of the text summary are stored, such as to containers 212, which may correspond to HTML or web-based data containers or structures that may be accessible to view, read, and/or process the original text and/or text summary. At step 8, an automated module 214 may then access containers 212 and/or other data structures storing the text documents, content, or other data for the original text and summary, which may include accessing container 212 to read the text data. At step 9, the data is provided to automated module 214 and processed using an evaluation framework to determine a precision evaluation. The precision evaluation may indicate whether the summary is of sufficient preciseness to be utilized during a corresponding fraud investigation or other activity, as well as whether the summary can or should be output to one or more users, or instead may instead require re-summarization and/or recreation.

As such, automated module 214 may include a precision evaluation system and operations, performed by an evaluation framework, to score and evaluate a precision of the summarization performed by the ML models or other AI engine. For example, automated module 214 may include an evaluation framework to calculate different individual metrics for precision evaluation of a text summary based on an original text, which may also be grouped and/or aggregated based on categories of metrics. One such metric may include a global coherence metric configured to evaluate and/or score the overall coherence and connectedness of sentences between two texts, the summary and original text. The aggregated, combined, and/or averaged scores from the categories may then be weighted using a weighting strategy, and an overall score may be computed from the weighted scores. The individual metrics, calculations, and overall score computations are described in further detail below with regard to FIGS. 3-5. Further, although the use of precision evaluation of AI generated text summaries is described above with regard to the domain of quality control and client delivery of recommendation content for fraud alerts, it is understood that other environments, domains, and fields may similarly use precision analysis of text summaries as described herein.

The output of automated module 214 may be compared, at step 10, to predefined parameters to determine compliance with such requirements. The predefined parameters may include one or more thresholds, such as a threshold score for the precision evaluation or other diagnostic analysis, that may be required to be met prior to reporting of the insights, recommendations, and/or summaries. At step 11, the comparison is output to a requirement decision engine, where, at step 12, it is determined whether the precision evaluation and comparison to predefined parameters 216 meet or exceed such requirements or threshold. If, at step 12, it is determined that the precision evaluation and other data of the AI generated summary meet the requirements, at step 12.1, the insights, recommendation, summary, diagnostic analysis, and the like may be output to a client 218. However, if not, at step 12.2, a decision may be reported back to LLM 204 for reprocessing of such data and further tuning prior to transmission to client 218.

Figure 3:
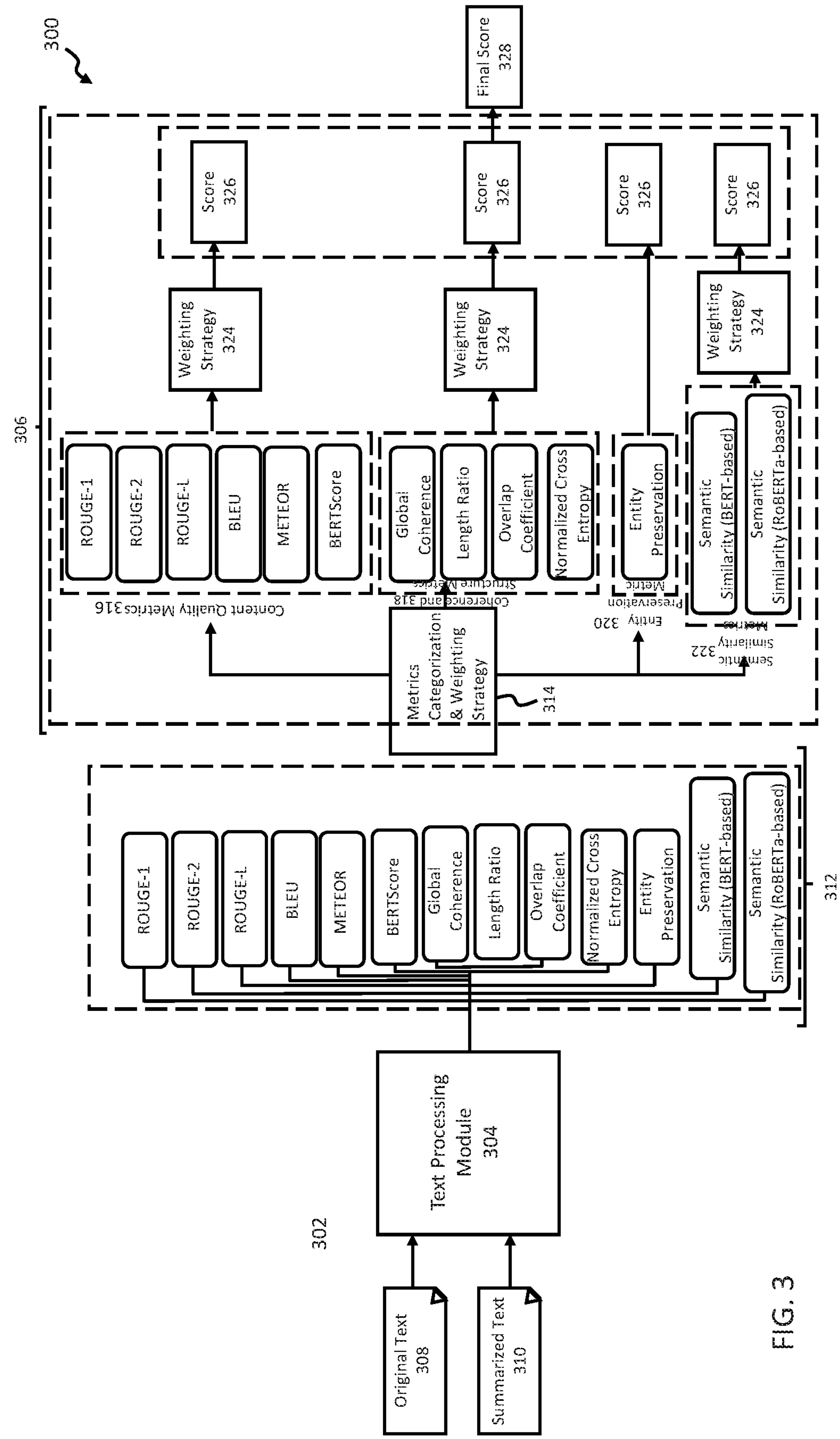
FIG. 3 is a simplified diagram of inputs and outputs for scoring summarizations of text content by an AI summarization engine according to some embodiments.

FIG. 3 is a simplified diagram of inputs and outputs for scoring summarizations of text content by an AI summarization engine according to some embodiments. Diagram 300 of FIG. 3 includes a precision assessment 302 for AI summarizations of text documents and other content, such as the precision assessments that may be performed by fraud detection system 120 from environment 100 of FIG. 1. In this regard, AI summarization engine 136 may be executed by fraud detection system 120 to perform precision assessment 302 in diagram 300.

For precision assessment 302, a text processing module 304 may interact with an evaluation strategy 306 for the evaluation framework shown in diagram 300 to process an original text 308 and a summarized text 310 from original text 308 for a precision evaluation. In this regard, original text 308 may correspond to a text document or other content, such as a fraud report, fraud alert, recommendation and/or insight regarding a fraud alert, or the like. Summarization text 310 may therefore correspond to a summarization of original text 308, which may have been generated using an AI summarization engine, such as one or more generative AIs, ML models, NNs, or other AI systems or engines for extractive and/or abstractive summarization. Text processing module 304 may perform preprocessing operations on original text 308 and summarized text 310 to prepare for processing and scoring using evaluation strategy 306 when processing precision assessment 302. For example, text processing module may perform tokenization, lemmatization, and/or entity extraction to prepare text, words, phrases, sentences, and the like for scoring according to different metrics.

Further, evaluation strategy 306 is shown utilizing a plurality of different metrics, shown as summarization evaluation metrics 312, which each may have a corresponding algorithm, ML model, and/or technique for computation. As such, summarization evaluation metrics 312 may include one or more of: ROUGE-1, 2, or L, BLEU, METEOR, BERTScore, RoBERTa, global coherence, length ration, overlap coefficient, normalized cross entropy, entity preservation, semantic similarity (BERT or RoBERTa-based scores), a precision-at-K score, and a word error rate. An exemplary process to calculate a global coherence score is shown in further detail with regard for FIG. 4 below.

Summarization evaluation metrics 312 may be calculated using the data from original text 308 and summarization text 310, and may be grouped and weighted according to a metrics categorization and weighting strategy 314. According to metrics categorization and weighting strategy 314, different categories of metrics may aggregate different ones of summarization evaluation metrics 312. For example, the categories in diagram 300 include content quality metrics 316, coherence and structure metrics 318, entity preservation metrics 320, and semantic similarity metrics 322.

Content quality metrics 316 may include ROUGE-1, 2, or L, BLEU, METEOR, and BERTScore, and in a preferred embodiment include all of these. Coherence and structure metrics 318 may include global coherence, length ration, overlap coefficient, and normalized cross entropy, and in a preferred embodiment include all of these. Entity preservation metrics 320 may include a specific metric identifying if entity preservation has occurred, and the degree to which such preservation occurred, between two texts. Semantic similarity metrics 322 may include BERT-based semantic similarity and RoBERTa-based semantic similarity. After calculating these metrics, a weighting strategy 324 may be applied to each individual metric (e.g., for weighting, aggregating, averaging, or otherwise obtaining an initial category score) so that scores 326 may be calculated per the categories. As such, scores 326 may include a weighted aggregate of the individual metrics within the corresponding category. Scores 326 may then be averaged, aggregated, or weighted in a final score 328, which may reflect the output of precision assessment 302. Thus, each category may be weighted equally or may each have a corresponding weight depending on importance and/or desired emphasis in a final precision evaluation computation of final score 328. As such, final score 328 may be used to determine the precision of summarized text 310, which may be compared to a threshold or other goal for further actions that may be taken with regard to summarized text 310. Final score 328 may also be used to update a data structure including original text 308 and/or summarized text 310, as well as be output via an interface and/or dashboard for review.

Figure 4:
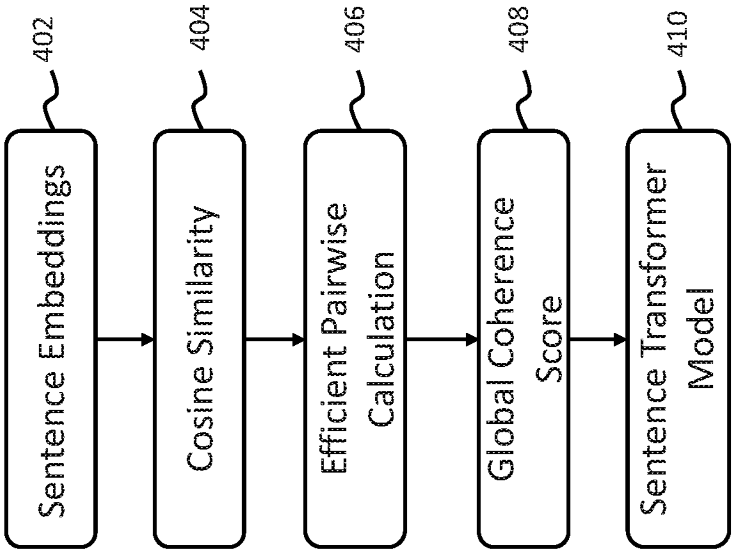
FIG. 4 is a simplified diagram of an exemplary flowchart for computing a global coherence score when scoring AI generated text summaries according to some embodiments.

FIG. 4 is a simplified diagram of an exemplary flowchart 400 for computing a global coherence score when scoring AI generated text summaries according to some embodiments. Note that one or more steps, processes, and methods described herein of flowchart 400 may be omitted, performed in a different sequence, or combined as desired or appropriate based on the guidance provided herein. Flowchart 400 of FIG. 4 includes operations executable by an evaluation framework that performs precision evaluations of AI generated text summaries, as discussed in reference to FIG. 1-3. One or more of steps 402-410 of flowchart 400 may be implemented, at least in part, in the form of executable code stored on non-transitory, tangible, machine-readable media that when run by one or more processors may cause the one or more processors to perform one or more of steps 402-410. In some embodiments, flowchart 400 can be performed by one or more computing devices discussed in environment 100 of FIG. 1.

At step 402 of flowchart 400, sentence embeddings are generated and created using the input text from an original text and a corresponding AI generated text summary that summarizes the original text. To generate sentence embeddings from the original text document and the summary, the evaluation framework may utilize pre-trained sentence embeddings provided by the "SentenceTransformer" model or similar model including proprietary trained ML models for sentence embeddings. In this regard, sentence embeddings may correspond to dense vector representations of sentences in a semantic vector space, capturing the contextual meaning of each sentence. These embeddings enable a better understanding of sentence relationships beyond simple keyword matching through vector analysis and comparison utilizing algorithms and computational techniques.

Prior to embedding, the original and summarized texts may be preprocessed. This may include removing numeric characters and punctuation. This preprocessing aims to focus on the textual content and remove any noise that may affect the embedding and/or topic modeling process. Preprocessing may use a "preprocess_string" function from the Gensim library or similar executable string and/or software library used for modeling. The string or other operation may be executed to preprocess the original and summarized texts, which may further include removal of numeric characters and punctuation, performance of string manipulation techniques, and the like.

At step 404, one or more cosine similarities are computed or calculated between matching or corresponding sentence embeddings for sentences between the original text and AI generated text summary. Cosine similarity may be computed as the similarity or distance, such as in vector space, angular space (e.g., measure of the angle in which to vectors point), or the like between two vectors. In text analysis, this may be used to measure the similarity in documents and/or text in documents (e.g., sentences). The cosine similarity may be calculated between all matching, similar, or paired sentences. A cosine similarity function between two vectors A and B for n features (e.g., n dimensions in vector space) may be computed using the following Equation 1:

Equation 1 cosine similarity =

$$S_O(A, B) := \cos(\theta) = \frac{A \cdot B}{\|A\|\|B\|} = \frac{\sum_{i=1}^{n} A_i B_i}{\sqrt{\sum_{i=1}^{n} A_i^2 \cdot \sum_{i=1}^{n} B_i^2}},$$

At step 406, an efficient pairwise calculation for pairs of sentences between the original text and AI generated text summary is computed or calculated based on the cosine similarity/similarities. When calculating cosine similarity between all paired sentences, the evaluation framework may consider only distinct pairs of sentences for efficiency, such as by employing n(n−1)/2 for n features (e.g., sentence distinctions per sentence embedding similarity). This optimization may significantly reduce computation time for large texts, thereby enhancing the evaluation of coherence and connectedness in the text summaries when utilizing global coherence as a distinct metric for precision evaluation of text summarization.

At step 408, a global coherence score is then computed or calculated using the cosine similarity/similarities and the efficient pairwise calculation. When computing the global coherence score, the evaluation framework may combine all sentence similarities by taking the average of all pairwise cosine similarities. The average value may then represent the global coherence score, which indicates the overall coherence and connectedness of the sentences in the given texts (e.g., the original text and AI generated text summary). A higher score indicates that the sentences are more coherent and contextually related in and between the texts.

At step 410, a sentence transformer model is the applied to and used to process the original text and AI generated text summary based on the global coherence score. The global coherence score may then be used by a sentence transformer model for further sentence embeddings that capture complex sentence relationships. For example, the sentence transformer may correspond to the "all-MiniLM-L6-v2" model provided by SentenceTransformer or similar model. In this regard, the model may be fine-tuned on various natural language understanding tasks to generate the sentence embeddings capturing the complex sentence relationships that may be used for further analysis.

In various embodiments, after data preprocessing at step 402 above and prior to sentence embedding, global coherence may also or alternatively be computing using an LDA model trained on a corpus of texts, where the corpus may include those texts used for topic modeling including at least the preprocessed original text and/or the preprocessed AI generated text summary. In this regard, the corpus may be created using such preprocessed texts, and the LDA model trained on the corpus. The LDA model may correspond to a generative statistical model that assigns topics to documents based on the distribution of words in the documents. A Gensim library or similar software library may be used to train an LDA model on the corpus. The LDA or other statistical model may rely on various mathematical techniques, such as probability theory and Bayesian inference, to identify latent topics in a collection of documents. The training process may involve estimating the topic-word and document-topic distributions using mathematical algorithms.

After training the LDA model, the topic distributions for the original and summarized texts may be obtained. These topic distributions may represent the probabilities of each topic being present in the texts. As such, the topic distributions may then be compared to calculate one or more similarity scores. For example, a Hellinger distance may be used to compare the topic distributions, where the Hellinger distance may be a measure of similarity between probability distributions. With Hellinger distances, a value of 0 indicates identical distributions and a value of 1 indicates completely distinct distributions. The similarity score may therefore be 1 minus the Hellinger distance so that a higher scores indicate higher similarity. To compute and calculate a Hellinger distance, mathematical formulas may be utilized that involve taking square roots and summing up squared differences for the vector representations and/or distances. The calculated similarity score may then represent the global coherence between the original and summarized texts regarding their underlying topics. A higher similarity score may suggest that the topics in the summarized text align well with those in the original text, indicating better coherence. The resulting similarity scores that are returned from this process may similarly be used at step 408 to determine the global coherence score.

Figure 5:
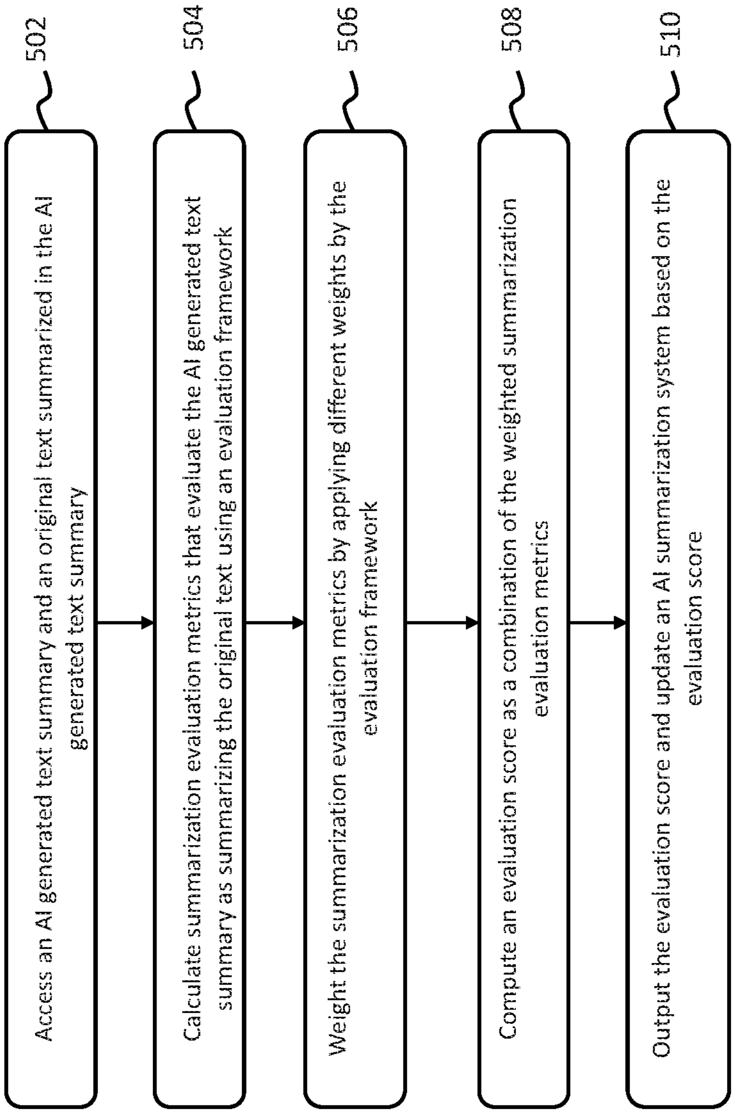
FIG. 5 is a simplified diagram of an exemplary flowchart executed by a precision evaluation system for AI generated text summaries according to some embodiments.

FIG. 5 is a simplified diagram of an exemplary flowchart 500 executed by a precision evaluation system for AI generated text summaries according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations executable by an evaluation framework when generating a precision evaluation of an AI generated text summary when compared to the original text from which the summary was generated, as discussed in reference to FIG. 1-4. One or more of steps 502-510 of flowchart 500 may be implemented, at least in part, in the form of executable code stored on non-transitory, tangible, machine-readable media that when run by one or more processors may cause the one or more processors to perform one or more of steps 502-510. In some embodiments, flowchart 500 can be performed by one or more computing devices discussed in environment 100 of FIG. 1.

At step 502 of flowchart 500, an AI generated text summary and original text summarized in the AI generated text summary is accessed, such as from a data container, file, storage, or other structure to which the texts are stored. In this regard, a data structure and/or data storage component may store original text content and AI generated text summaries generated by an AI summarization engine and/or model(s) for extractive and/or abstractive summarization of the original text content. The data structure may correspond to a file, container, or the like that may be utilized as input for an evaluation framework that may calculate individual metric scores for summarization evaluation metrics. In this regard, the data structure may include, or may be processed to generate, preprocessed data usable as input to one or more scoring engines and/or ML models for calculation of the metrics. For example, the data, prior to accessing at step 502 or later processing at step 504, may be preprocessed and/or have words, phrases and/or sentences tokenized, which may include generating word and/or sentence embeddings for processing.

At step 504, summarization evaluation metrics that evaluate the AI generated text summary as summarizing the original text are calculated using an evaluation framework. The summarization evaluation metrics may be grouped in categories by the evaluation framework, such as a content quality metrics category, a coherence and structure metrics category, a semantic similarity metrics category, an entity preservation metrics category, or any combination thereof. The metrics may be computed using the following algorithms, ML models, or other techniques for summarization evaluation: ROUGE-1, 2, or L, BLEU, METEOR, BERTScore, robustly optimized BERT pretraining approach (RoBERTa), global coherence, length ration, overlap coefficient, normalized cross entropy, entity preservation, semantic similarity (BERT or RoBERTa-based scores), a precision-at-K score, a word error rate, or any combination thereof.

In one embodiment where four categories may be used (e.g., a content quality metrics category, a coherence and structure metrics category, a semantic similarity metrics category, and an entity preservation metrics category), each category may include metrics grouped as follows: Content quality metrics: ROUGE-1, 2, or L, BLEU, METEOR, and BERTScore. Coherence and structure metrics: Global coherence, length ration, overlap coefficient, and normalized cross entropy. Semantic similarity metrics: BERT-based semantic similarity and RoBERTa-based semantic similarity. The entity preservation category may include a single or selection of such preservation metrics designed to identify whether named or important entities are retained in and/or between texts. The aforementioned metrics may be calculated on an individual basis by the evaluation framework using corresponding algorithms, ML models, and computational engines, and the scores may be collected and/or arranged for aggregating and weighting.

When computing a global coherence metric, operations may be executed to create sentence embeddings, calculate cosine similarities between pairs of sentences using an efficient pairwise calculation for only those matching or highly correlated sentences and/or embeddings, compute a global coherence score as an average of the sentence similarities, and utilize a sentence transformer model for further sentence embeddings for sentence relationships. In other embodiments, for calculation of the global coherence metric, a text corpus may be generated using the original text and summary, which may be used to train an LDA model to assign topics in each of the original text and summary based on word distributions and obtain a topic distribution. The topic distributions may be compared between the original text and the summary, with a similarity score returned for the global coherence metric. The similarity metric may use a Hellinger distance.

At step 506, the summarization evaluation metrics are weighted by applying different weights by the evaluation framework. The evaluation framework may include a weighting strategy that weights the aggregated scores per category on an individual basis, which may be the same (e.g., for four categories, 25% each) or different per category depending on importance and/or configurations or settings. As such, a weighting strategy may be applied to obtain multiple weighted scores based on the metrics calculated by the evaluation framework.

At step 508, an evaluation score is computed as a combination of the weighted summarization evaluation metrics. The evaluation framework may then aggregate the weighted scores of the metrics and may compute an overall final evaluation score for the summarization of the original text in the AI generated text summary. As such, the evaluation score may reflect multiple individual metrics that indicate how well the summary summarizes the original text. At step 510, the evaluation score is outputted and an AI summarization system is updated based on the evaluation score. For example, the data structure may be updated and/or changed to include and/or reflect the evaluation score so that further use of the summary may indicate how well the summary summarizes the original text and/or if the summary may need to be redone, revised, reviewed, or changed/deleted. Further, a user interface, dashboard within a portal and/or application (standalone or web-based), or the like may be updated to include the score, as well as options for summary usage and/or revision.

As discussed above and further emphasized here, FIGS. 1, 2, 3, 4, and 5 are merely examples of fraud detection system 120 and corresponding methods for an evaluation framework that determined precision evaluations of AI generated text summaries, which said examples should not be used to unduly limit the scope of the claims. One of ordinary skill in the art would recognize many variations, alternatives, and modifications.

Figure 6:
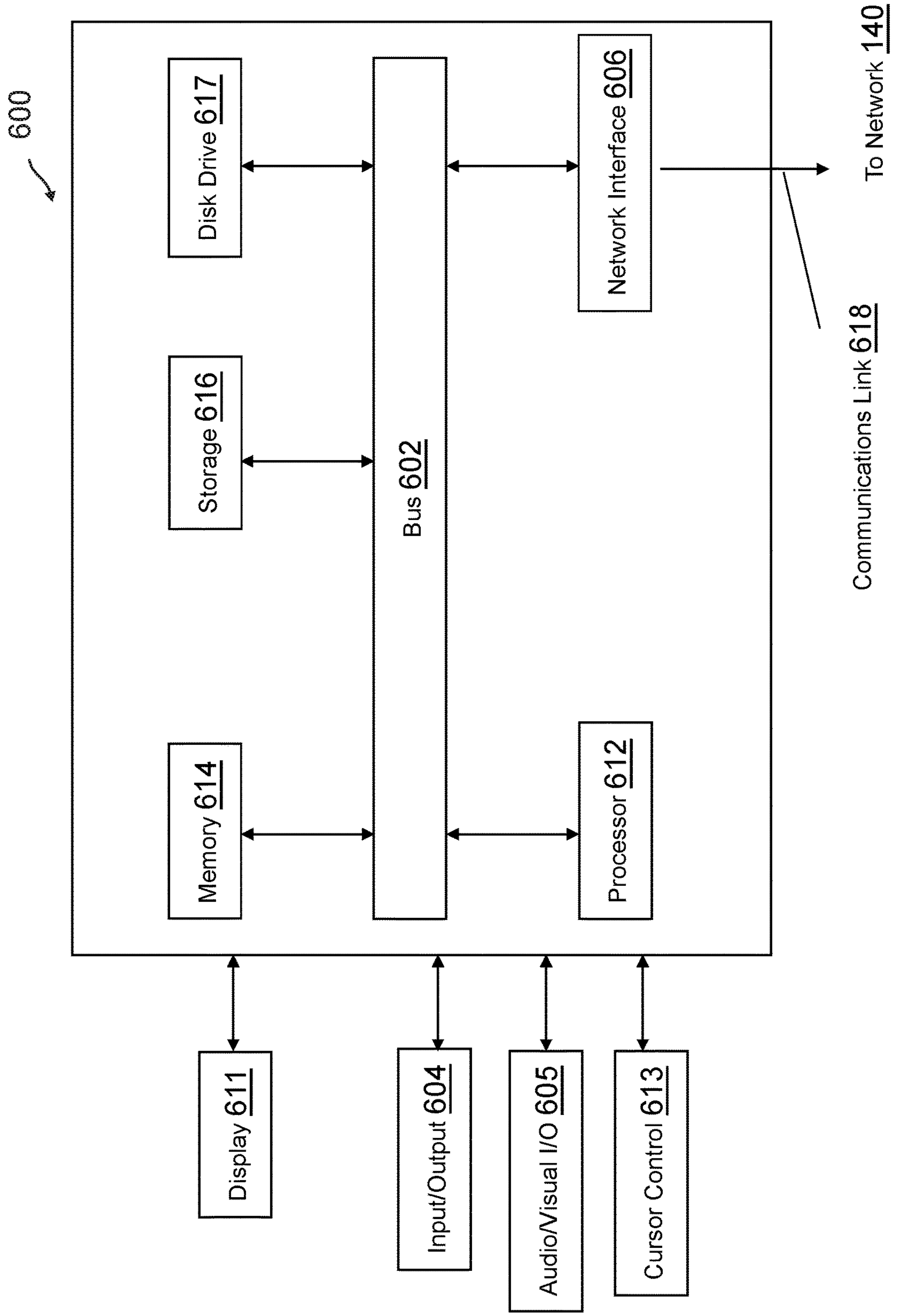
FIG. 6 is a simplified diagram of a computing device according to some embodiments.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A machine learning (ML) system configured to evaluate artificial intelligence (AI) generated text summaries using an evaluation framework for a weighting strategy of a plurality of metrics, the ML system comprising:

a processor and a computer readable medium operably coupled thereto, the computer readable medium comprising a plurality of instructions stored in association therewith that are accessible to, and executable by, the processor, to perform summary evaluation operations which comprise:

accessing, for a precision evaluation of an AI generated text summary using the evaluation framework, a data structure including the AI generated text summary and an original text summarized in the AI generated text summary by an AI summarization engine;

calculating a plurality of summarization evaluation metrics that evaluate a summarization of the original text in the AI generated text summary using the evaluation framework with the AI generated text summary and the original text, wherein the plurality of summarization evaluation metrics are selected for the evaluation framework based on a relevance assessment and a significance assessment of each of the plurality of summarization evaluation metrics when performing the precision evaluation of the summarization, and wherein, one of the plurality of summarization evaluation metrics comprises calculating a global coherence metric by preprocessing the original text and the AI generated text summary and creating a text corpus representing the original text and the AI generated text summary for a topic modeling of topics used for assessing a topic similarity;

weighting the plurality of summarization evaluation metrics based on a plurality of weights applied by the evaluation framework;

computing a final evaluation score of the summarization of the original text in the AI generated text summary by the AI summarization engine based on an aggregation of the weighted plurality of summarization evaluation metrics;

outputting the precision evaluation of the AI generated text summary based on the computed final evaluation score; and updating the data structure with the computed final evaluation score for the precision evaluation.

2. The ML system of claim 1, wherein the global coherence metric is configured to assess the topic similarity between the original text and the AI generated text summary.

3. The ML system of claim 1, wherein the calculating the plurality of summarization evaluation metrics comprises calculating the global coherence metric further by:

training a Latent Dirichlet Allocation (LDA) model using the text corpus, wherein the LDA model assigns the topics to each of the original text and the AI generated text summary based on a distribution of words in the original text and the AI generated text summary;

obtaining a topic distribution of the topics in each of the original text and the AI generated text summary using the LDA model with the original text and the AI generated text summary;

comparing the topic distribution of the topics in the original text with the topic distribution of the topics in the AI generated text summary; and returning a similarity score of the topics between the original text and the AI generated text summary based on the comparing.

4. The ML system of claim 3, wherein the calculating the global coherence metric utilizes at least one of a preprocessing string function, a topic modeling library for the LDA model, a Hellinger distance for a similarity measurement corresponding to the similarity score, or a similarity score calculation with the similarity measure for the similarity score.

5. The ML system of claim 1, wherein the plurality of summarization evaluation metrics further comprise at least one of a recall-oriented understudy for Gisting evaluation (ROUGE)-2 score, a ROUGE-L score, a bilingual evaluation understudy (BLEU) score, a metric for evaluation of translation with explicit ordering (METEOR) score, a bidirectional encoder representations from transformers (BERT) score, an entity preservation score, a semantic similarity score using BERT or robustly optimized BERT pretraining approach (RoBERTa), a length ratio, a precision-at-K score, a word error rate, a normalized cross entropy, or an overlap coefficient.

6. The ML system of claim 1, wherein the plurality of summarization evaluation metrics are split into four categories each having a subset of the plurality of summarization evaluation metrics, and wherein the plurality of weights comprise one of a same weight or a different configurable weight applied to each of the four categories when performing the weighting the plurality of summarization evaluation metrics.

7. The ML system of claim 6, wherein the four categories comprise a content quality metrics category, a coherence and structure metrics category, a semantic similarity metrics category, and an entity preservation metrics category.

8. The ML system of claim 7, wherein calculating the plurality of summarization evaluation metrics include separately calculating each of the four categories using the subset of the plurality of summarization evaluation metrics for a corresponding one of the four categories.

9. The ML system of claim 1, wherein, prior to the calculating the plurality of summarization evaluation metrics, the summary evaluation operations further comprise:

preprocessing the AI generated text summary and the original text; and tokenizing preprocessed text in the AI generated text summary and the original text, wherein the calculating the plurality of summarization evaluation metrics using the evaluation framework is with the tokenized preprocessed text from the AI generated text summary and the original text.

10. A method to evaluate artificial intelligence (AI) generated text summaries using an evaluation framework for a weighting strategy of a plurality of metrics by a machine learning (ML) system, the method comprising:

accessing, for a precision evaluation of an AI generated text summary using the evaluation framework, a data structure including the AI generated text summary and an original text summarized in the AI generated text summary by an AI summarization engine;

calculating a plurality of summarization evaluation metrics that evaluate a summarization of the original text in the AI generated text summary using the evaluation framework with the AI generated text summary and the original text, wherein the plurality of summarization evaluation metrics are selected for the evaluation framework based on a relevance assessment and a significance assessment of each of the plurality of summarization evaluation metrics when performing the precision evaluation of the summarization, and wherein, one of the plurality of summarization evaluation metrics comprises calculating a global coherence metric by preprocessing the original text and the AI generated text summary and creating a text corpus representing the original text and the AI generated text summary for a topic modeling of topics used for assessing a topic similarity;

weighting the plurality of summarization evaluation metrics based on a plurality of weights applied by the evaluation framework;

computing a final evaluation score of the summarization of the original text in the AI generated text summary by the AI summarization engine based on an aggregation of the weighted plurality of summarization evaluation metrics;

outputting the precision evaluation of the AI generated text summary based on the computed final evaluation score; and updating the data structure with the computed final evaluation score for the precision evaluation.

11. The method of claim 10, wherein the global coherence metric is configured to assess the topic similarity between the original text and the AI generated text summary.

12. The method of claim 10, wherein the calculating the plurality of summarization evaluation metrics comprises calculating the global coherence metric further by:

training a Latent Dirichlet Allocation (LDA) model using the text corpus, wherein the LDA model assigns the topics to each of the original text and the AI generated text summary based on a distribution of words in the original text and the AI generated text summary;

obtaining a topic distribution of the topics in each of the original text and the AI generated text summary using the LDA model with the original text and the AI generated text summary;

comparing the topic distribution of the topics in the original text with the topic distribution of the topics in the AI generated text summary; and returning a similarity score of the topics between the original text and the AI generated text summary based on the comparing.

13. The method of claim 12, wherein the calculating the global coherence metric utilizes at least one of a preprocessing string function, a topic modeling library for the LDA model, a Hellinger distance for a similarity measurement corresponding to the similarity score, or a similarity score calculation with the similarity measure for the similarity score.

14. The method of claim 10, wherein the plurality of summarization evaluation metrics further comprise at least one of a recall-oriented understudy for Gisting evaluation (ROUGE)-2 score, a ROUGE-L score, a bilingual evaluation understudy (BLEU) score, a metric for evaluation of translation with explicit ordering (METEOR) score, a bidirectional encoder representations from transformers (BERT) score, an entity preservation score, a semantic similarity score using BERT or robustly optimized BERT pretraining approach (RoBERTa), a length ratio, a precision-at-K score, a word error rate, a normalized cross entropy, or an overlap coefficient.

15. The method of claim 10, wherein the plurality of summarization evaluation metrics are split into four categories each having a subset of the plurality of summarization evaluation metrics, and wherein the plurality of weights comprise one of a same weight or a different configurable weight applied to each of the four categories when performing the weighting the plurality of summarization evaluation metrics.

16. The method of claim 15, wherein the four categories comprise a content quality metrics category, a coherence and structure metrics category, a semantic similarity metrics category, and an entity preservation metrics category.

17. The method of claim 16, wherein calculating the plurality of summarization evaluation metrics include separately calculating each of the four categories using the subset of the plurality of summarization evaluation metrics for a corresponding one of the four categories.

18. The method of claim 10, wherein, prior to the calculating the plurality of summarization evaluation metrics, the method further comprises:

preprocessing the AI generated text summary and the original text; and tokenizing preprocessed text in the AI generated text summary and the original text, wherein the calculating the plurality of summarization evaluation metrics using the evaluation framework is with the tokenized preprocessed text from the AI generated text summary and the original text.

19. A non-transitory computer-readable medium having stored thereon computer-readable instructions executable to evaluate artificial intelligence (AI) generated text summaries using an evaluation framework for a weighting strategy of a plurality of metrics by a machine learning (ML) system, the computer-readable instructions executable to perform summary evaluation operations which comprise:

accessing, for a precision evaluation of an AI generated text summary using the evaluation framework, a data structure including the AI generated text summary and an original text summarized in the AI generated text summary by an AI summarization engine;

calculating a plurality of summarization evaluation metrics that evaluate a summarization of the original text in the AI generated text summary using the evaluation framework with the AI generated text summary and the original text, wherein the plurality of summarization evaluation metrics are selected for the evaluation framework based on a relevance assessment and a significance assessment of each of the plurality of summarization evaluation metrics when performing the precision evaluation of the summarization, and wherein, one of the plurality of summarization evaluation metrics comprises calculating a global coherence metric by preprocessing the original text and the AI generated text summary and creating a text corpus representing the original text and the AI generated text summary for a topic modeling of topics used for assessing a topic similarity;

weighting the plurality of summarization evaluation metrics based on a plurality of weights applied by the evaluation framework;

computing a final evaluation score of the summarization of the original text in the AI generated text summary by the AI summarization engine based on an aggregation of the weighted plurality of summarization evaluation metrics;

outputting the precision evaluation of the AI generated text summary based on the computed final evaluation score; and updating the data structure with the computed final evaluation score for the precision evaluation.

20. The non-transitory computer-readable medium of claim 19, wherein the global coherence metric is configured to assess the topic similarity between the original text and the AI generated text summary.

* * * * *